United States Patent Office 3,188,307
Patented June 8, 1965

3,188,307
ALKENYL-N-SULFO-OXY-HYDROCARBON-IMIDES
Walter E. Kramer, Niles, Ill., assignor to The Pure Oil Company, Chicago, Ill., a corporation of Mexico
No Drawing. Filed Apr. 13, 1962, Ser. No. 187,211
10 Claims. (Cl. 260—239.3)

This invention relates to compounds having detergent, wetting, and surface-active properties and, more particularly, to substituted imidyl acid sulfates and salts thereof. The water-soluble salts of this invention are especially useful as biologically degradable detergents.

While many different types of detergents have been proposed in the past for utilization in household detergent formulations, only a few types have attained widescale use. The four most important classes are: quaternary ammonium compounds, sodium fatty alcohol sulfates, sodium alkylbenzenesulfonates, and polyoxyethylene-alkylphenol condensates. Of these major classes, only the fatty alcohol sulfates are destroyed by the common bacteria in sewage disposal plants. As a result, large amounts of the alkylbenzenesulfonates and non-ionic detergents, the most widely used in household detergent formulations, pass through the sewage disposal plants into streams, polluting them and causing the formation of copious amounts of foam. In addition, large amounts of foam also form in the treating plants, thereby causing operating difficulties.

In accordance with this invention, I have discovered a new class of bio-degradable detergents which are derived from alkenyl-substituted anhydrides and sulfated alkanolamines. The superior, biologically degradable detergents of this invention are prepared by a combined process of condensation and sulfation. In the condensation step, an alkyenyl-substituted cyclic anhydride is condensed with an alkanolamine. Sulfation of the resultant condensation product is effected by contacting same with an active sulfating reagent. The acid sulfate separated from the reaction mixture may be utilized as the free acid, or, preferably, is reacted with a basic reagent to form an acid sulfate salt which comprises the present invention.

These compounds are decomposed by a combination of biological oxidation and hydrolysis in sewage-treating plants to form decomposition products which do not have detergent properties, are not injurious to plant and fish life, and are absorbed by the soil as the water passes through it.

It is an object of this invention to provide novel substituted imidyl acid sulfates and salts thereof. Another object of this invention is to provide a method of preparing novel, substituted, imidyl acid sulfates and salts thereof. Still another object of this invention is to provide novel, substituted, imidyl acid sulfates and salts thereof which are derived from alkenyl-substituted cyclic anhydrides and alkanolamines. A further object of this invention is to provide a method of preparing novel, substituted, imidyl acid sulfates by condensing an alkenyl-substituted cyclic anhydride with an alkanolamine and sulfating the resulting condensation product. A still further object of this invention is to provide a method of preparing novel, substituted, imidyl acid sulfate salts by condensing an alkenyl-substituted cyclic anhydride with an alkanolamine, sulfating the resulting condensation product, and reacting the acid sulfate thus formed with an acid-neutralizing reagent. A still further object of this invention is to provide novel compounds having detergent properties and a method for preparing the same.

The novel compounds of this invention are represented by the formula,

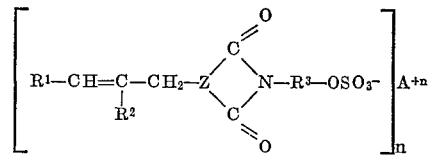

wherein Z is a radical selected from the group consisting of lower aliphatic, mononuclear aryl, polynuclear aryl, and cycloalkyl radicals; $R^1$ is an organic radical containing an aliphatic group with about 6 to 20 carbon atoms, preferably from about 7 to 15 carbon atoms; $R^2$ is of the group consisting of hydrogen and lower aliphatic radicals, preferably containing from about 1 to 4 carbon atoms; $R^3$ is an organic radical containing up to about 12 carbon atoms, preferably up to about 6 carbon atoms, in any aliphatic portion thereof; $R^4$ and $R^5$ are the same or different radicals of the group consisting of hydrogen and lower aliphatic radicals; A is a cation; and $n$ is the valence of A.

$R^1$ may be an aliphatic radical having a straight or branched chain and it may be saturated or unsaturated, including mono-olefinic and non-conjugated di-olefinic radicals. Furthermore, the radical $R^1$ may be unsubstituted or it may contain substituents, such as aryl and cycloalkyl groups. In addition, $R^1$ includes aryl and cycloalkyl radicals having straight or branched aliphatic side chains, either saturated or unsaturated. The radical $R^2$ may be a straight or branched-chain radical, either unsaturated or saturated. $R^3$ may be a saturated or unsaturated aliphatic radical having either a straight or branched chain, as well as an aryl or cycloalkyl radical, with or without an aliphatic substituent.

More specifically, examples of $R^1$ include radicals such as hexyl, isohexyl, heptyl, isoheptyl, octyl, isooctyl, nonyl, isononyl, decyl, hexenyl, isoheptenyl, heptylphenyl, isohexylphenyl, isodecenylphenyl, nonylcyclohexyl, octylcyclobutene, phenyloctyl, phenylnonenyl, cyclopentylnonyl, and the like. Examples of $R^2$ include hydrogen, and radicals such as methyl, ethyl, propyl, isopropyl, butyl, isobutyl, t-butyl, ethenyl, butenyl, etc. Examples of $R^3$ include radicals such as ethylene, propylene, isopropylene, butylene, isobutylene, decylene, isodecylene, hendecylene, dodecylene, isododecylene, vinylene, butenylene, hexenylene, cyclohexylene, butylcyclobutenylene, phenylene, naphthylene, etc. Examples of A include alkali metals, such as sodium, potassium, lithium, cesium, and rubidium; alkaline earth metals, such as barium, calcium, strontium, and magnesium; mercury; iron; lead; aluminum; and radicals derived from nitrogen bases such as ammonia, amines, urea, and guanidine; etc.; i.e., those substances which lose an electron or take up a proton and become positively charged. A is preferably an alkali metal when the novel compounds of my invention are utilized as water-soluble detergents. Examples of Z include lower aliphatic radicals of the formula,

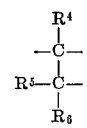

wherein $R^4$, $R^5$ and $R^6$ are the same or different radicals of the group consisting of hydrogen and lower aliphatic radicals, such as ethyl, propyl, butyl; mononuclear aryl radicals, such as phenyl and substituted phenyl radicals; polynuclear aryl radicals, such as

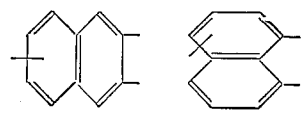

and substituted derivatives thereof; and cycloalkyl radicals, such as cyclopropyl, cyclobutyl, cyclopentyl, and cyclohexyl radicals.

In my detergents, the double bond in the side chain permits removal of the chain by oxidation, destroying the detergent properties. Hydrolysis of the nitrogen-carbon group destroys or greatly reduces solubility, as does hydrolysis of the sulfate group. Consequently, pollution of streams and ponds is greatly reduced or eliminated.

Compounds which are especially useful are alkenyl-substituted succinimidyl acid sulfates and salts thereof of the general formula,

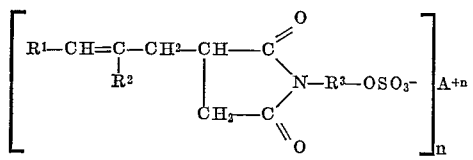

wherein $R^1$, $R^2$, $R^3$, A, and $n$ are characterized as hereinbefore defined.

In the process of this invention, an alkenyl-substituted cyclic anhydride of the formula,

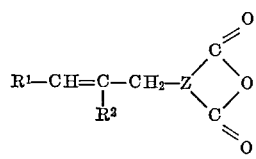

wherein $R^1$, $R^2$, and Z are characterized as hereinbefore defined, is reacted with an alkanolamine of the formula,

$$H_2N—R^3—OH$$

wherein $R^3$ is characterized as hereinbefore defined. This condensation reaction takes place according to the following general equation:

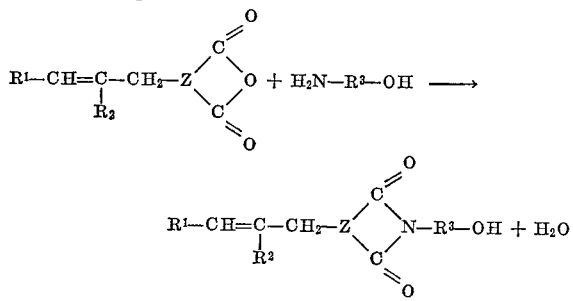

The alkenyl-substituted anhydrides utilized as intermediates in preparing the acid sulfates and acid sulfate salts of this invention can be prepared by any suitable method, as for example, by condensing a cyclic anhydride having a double bond between two carbon atoms with a monoolefin, or a non-conjugated poly-olefin, for about 1–4 hours at a temperature within the range of about 150° to 250° C. in an inert atmosphere. The olefins may have straight or branched chains, and they may be unsubstituted or have substituent groups such as alkyl, cycloalkyl, and aryl groups. Since the alkenyl substituent connected to the resulting substituted anhydride by the condensation reaction will correspond in configuration to the specific olefin utilized in the condensation reaction, it will be evident that the olefins utilized must be so chosen that the alkenyl-substituted anhydride corresponds in configuration to the foregoing generic formula. Examples of anhydrides which may be used include maleic, itaconic, citraconic, phthalic, naphthalic, 2,3-naphthalenedicarboxylic, cis-cyclopropane-1,2-dicarboxylic, cis-cyclobutane-1,2-dicarboxylic, cis-cyclopentane-1,2-dicarboxylic, and cis-cyclohexane-o-dicarboxylic acid anhydrides.

The alkanolamine may, for example, be monoethanolamine, propanolamine, isopropanolamine, butanolamine, isobutanolamine, 4-amino-1-naphthol, m-aminophenol, and the like.

The reaction is preferably carried out at a temperature within the range of about 150° to 200° C., although temperatures within the range of about 100° to 350° C. may be used. The time of reaction, of course, is related to the reaction temperature, but, in general, will vary from about 1–4 hours. The reaction takes place rapidly enough in the absence of a catalyst. Although the ratio of reactants is not critical, it is preferred to use stoichiometric proportions to avoid the problem of separating the product from unreacted material. Using stoichiometric proportions, the reaction is accompanied by the formation of one mole of water per mole of each of the reactants.

A hydrocarbon which forms an azeotropic mixture with water, such as benzene, toluene, or xylene, is preferably added to the reaction mixture to facilitate the removal of the water of amidation. The reaction is allowed to proceed until completion, which is determined by the formation of one mole of water per mole of each of the reactants when stoichiometric proportions of the reactants are utilized, and heating is continued until removal of water by azeotropic distillation has substantially ceased.

When substantially all of the water of condensation has been removed by azeotropic distillation, the mixture is cooled to a temperature within the range of about 0° to 10° C., preferably within the range of about —5° to +5° C., and a suitable sulfating agent is added slowly to produce the acid sulfate. Examples of suitable sulfating agents are concentrated (90–100% $H_2SO_4$) or fuming (greater than 100% $H_2SO_4$) sulfuric acid, chlorosulfonic acid, mixtures of sulfur dioxide and sulfur trioxide, and a sulfur trioxide complex, such as dioxane-sulfur trioxide complex. It will be evident that when $R^3$ includes non-aromatic unsaturation, the sulfating agent necessarily is an agent which will not sulfonate the unsaturated bond, such as a sulfur dioxide-sulfur trioxide mixture, or a sulfur trioxide complex.

The acid sulfates thus formed are then converted to the corresponding acid sulfate salts by slowly adding a suitable acid-neutralizing reagent containing the desired cation A, such as ammonia, alkali metal, alkaline earth metal and transition metal oxides, hydroxides, carbonates and bicarbonates. These reagents include sodium hydroxide, potassium hydroxide, lithium hydroxide, rubidium hydroxide, calcium oxide, calcium hydroxide, barium oxide, potassium carbonate, magnesium oxide, strontium hydroxide, aluminum hydroxide, copper hydroxide, ammonia, pyridine, 2-aminopyridine, 3-dimethylamine, trimethylamine, isohexylamine, diisopropylamine, benzylamine, etc. Various hydroxy compounds, such as 2-amino-ethanol, 2-bromo-ethanol, monoethanolamine, diethanolamine and triethanolamine may also be used. Mixtures of two or more of the foregoing reagents may be used to form mixed salts, or the acid sulfates may be reacted sequentially with different reagents. Although the ratio of the reactants in the sulfation and neutralization reactions is not critical, stoichiometric proportions are again preferably utilized to avoid the problem of separating the product from unreacted materials.

The acid sulfate salts are recovered by any suitable method. For example, the water-soluble salts may be recovered by drawing off the aqueous layer and extracting it with ether, followed by evaporating the water, leaving the acid sulfate salt as residue. The water-insoluble salts may be recovered by filtration.

Alternatively, the acid sulfates may be recovered, as by evaporation of the water, and used as the free acids without conversion to the corresponding acid sulfate salts.

This invention is demonstrated by the following non-limiting examples:

EXAMPLE I

One mole (254 grams) of tetrapropenyl succinic anhydride is reacted with one mole (61 grams) of monoethanolamine at a temperature of 200° C., in the presence of xylene to remove the water of amidation. When the one mole of water (18 grams) is formed and removed, the mixture is immersed in an ice bath and cooled to a temperature of 5° C. Then one mole (102 grams) of 96% sulfuric acid is added slowly to form the acid sulfate, viz, 2-(3-tetrapropenylsuccinimidyl) - ethyl - 1 - acid sulfate. One mole (40 grams) of sodium hydroxide, dissolved in 100 ml. of water, is then added to form the 2-(3-tetrapropenylsuccinimidyl)-ethyl-1-acid sulfate sodium salt. The aqueous layer is then drawn off and extracted with ethyl ether, and the water is evaporated from the washed aqueous phase, leaving the acid sulfate sodium salt as residue.

A series of experiments, enumerated in Table I, is carried out in which various alkenyl-substituted anhydrides are reacted with equimolar amounts of various alkanolamines, in the presence of an azeotroping hydrocarbon, to produce the product of condensation in accordance with the general equation,

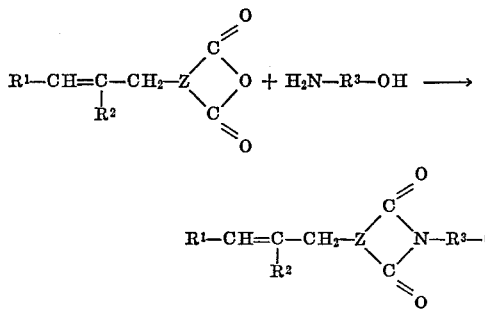

The water of condensation is removed by azeotropic distillation from the condensation product which is then sulfated by reaction with a stoichiometric proportion of a suitable sulfating agent to form the acid sulfate of the formula,

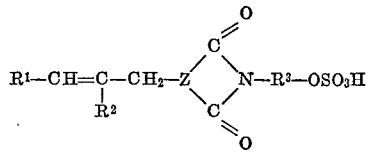

After the acid sulfate is thus formed, it is neutralized with a stoichiometric proportion of a suitable neutralizing reagent to form the acid sulfate salt of the formula,

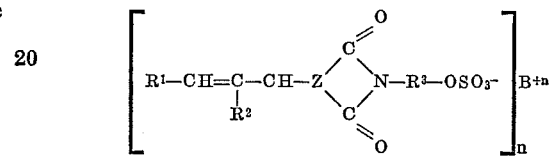

In Table I the R groups in the various reactants and products and the radical of the acid sulfate salt, designated as B and derived from the neutralizing reagent, are used to define the various reactants and products due to the lengths of both the formula and chemical names of the compounds. Table I also includes the various sulfating agents, basic reagents, azeotroping hydrocarbons, and reaction temperatures which are utilized.

*Table I*

| Experiment Number | Z | $R^1$ | $R^2$ | $R^3$ |
|---|---|---|---|---|
| 1 | —CH—<br>\|<br>CH$_2$— | $CH_3$—$(CH_2)_9$— | H— | —$(CH_2)_3$— |
| 2 | CH$_2$—<br>\|<br>—CH— | $CH_3$—$(CH_2)_5$— | $CH_3$—$CH_2$— | —⟨C$_6$H$_4$⟩— |
| 3 | —CH—<br>\|<br>CH$_2$— | $CH_3$—$(CH_2)_6$—⟨C$_6$H$_4$⟩— | H— | —$CH_2$—CH—$CH_2$—<br>\|<br>$CH_3$ |
| 4 | CH$_2$—<br>\|<br>—CH— | $CH_3$—$(CH_2)_4$—CH=CH—$(CH_2)_2$— | H— | —$(CH_2)_4$—CH=CH— |
| 5 | \C/<br>/ \<br>CH$_2$—CH— | $CH_3$—$(CH_2)_5$—CH—$CH_3$—<br>\|<br>$CH_3$ | $CH_3$—CH—<br>\|<br>$CH_3$ | —$(CH_2)_{12}$— |
| 6 | —CH—$CH_2$—<br>\|<br>$CH_2$—$CH_2$— | $CH_3$—$(CH_2)_4$—CH—$(CH_2)_2$—<br>\|<br>⟨C$_6$H$_5$⟩ | $CH_3$— | —$(CH_2)_5$—CH—$CH_2$—<br>\|<br>$CH_2$<br>\|<br>$CH_3$ |
| 7 | ⟨C$_6$H$_4$⟩ | $CH_3$—CH—$(CH_2)_5$—CH—$CH_2$—<br>\|           \|<br>$CH_3$        $CH_3$ | $CH_3$—$(CH_2)_3$— | —$(CH_2)_2$— |
| 8 | ⟨naphthyl⟩ | $CH_3$—$(CH_2)_8$— | H— | —$(CH_2)_5$— |

Table I—Continued

| Experiment Number | Condensation reaction | | Sulfating reaction | | Neutralizing agent | B |
|---|---|---|---|---|---|---|
| | Reaction temp., °C. | Azeotroping hydrocarbon | Reaction temp., °C. | Sulfating agent | | |
| 1 | 200 | Xylene | 0 | 96% sulfuric acid | KOH | K |
| 2 | 200 | do | 5 | Chlorosulfonic acid | Li$_2$CO$_3$ | Li |
| 3 | 200 | do | 5 | 96% sulfuric acid | NH$_3$ | NH$_4$ |
| 4 | 200 | do | 0 | SO$_2$—SO$_3$ | NH$_2$—CH$_3$ | NH$_3$—CH$_3$ |
| 5 | 200 | do | 10 | SO$_2$—SO$_3$ | CsOH | Cs |
| 6 | 200 | do | 0 | Dioxane-sulfur trioxide complex. | NaOH | Na |
| 7 | 200 | do | 5 | 104% sulfuric acid | NH$_3$ | NH$_4$ |
| 8 | 200 | do | 0 | 98% sulfuric acid | N(CH$_2$CH$_2$OH)$_3$ | HN(CH$_2$CH$_2$OH)$_3$ |

Using Experiment Number 1 as an example of Table I, one mole each of 2-tridecenyl succinic anhydride and propanolamine are heated to a temperature of 200° C. in the presence of xylene. When one mole of water is formed and removed by azeotropic distillation, the mixture is cooled to a temperature of 5° C. The acid sulfate, 3-[3-(2-tridecenylsuccinimidyl)]-propyl-1-acid sulfate, is prepared by slowly adding one mole of 96% sulfuric acid. After the acid sulfate is thus formed, one mole of potassium hydroxide dissolved in 100 ml. of water is added to form the acid sulfate potassium salt, 3-[3-(tridecenylsuccinimidyl)]-propyl-1-acid sulfate potassium salt. The aqueous layer is then drawn off and extracted with ethyl ether, and the water is evaporated from the washed aqueous phase leaving the acid sulfate potassium salt as residue.

While the acid sulfates prepared in accordance with this invention are useful as intermediates in preparing the acid sulfate salts of this invention, they are perhaps most useful as detergents. The water-soluble, acid-sulfate alkali-metal salts are especially useful as biologically degradable detergents in household detergent formulations, and the water-insoluble acid sulfate salts are useful, for example, as grease-compounding agents.

Although this invention has been described in relation to specific embodiments, it will be apparent that obvious modifications can be made by one skilled in the art without departing from the intended scope. For example, the anhydride may include substituents other than the alkenyl radical indicated in the foregoing generic formulae, such as lower aliphatic radicals. In addition, the carbon chains of the imide molecule may contain substituents which are inert in the reaction environments, such as halogen and nitro groups.

The embodiments of this invention in which an inclusive property or privilege is claimed are defined as follows:

1. A compound of the formula:

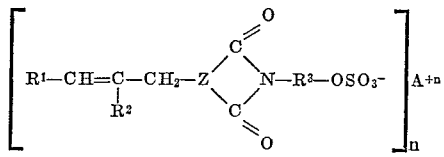

wherein Z is selected from the group consisting of

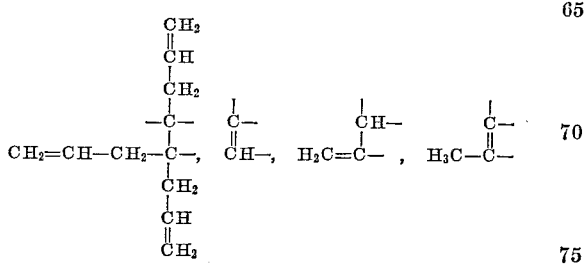

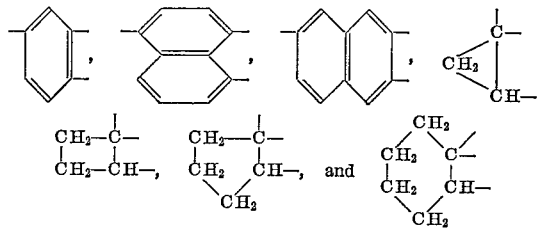

$R^1$ is selected from the group consisting of hydrogen, alkyl having 6 to 20 carbon atoms, cyclohexyl, octylcyclobutene, phenyloctyl, phenylnonenyl and cyclopentylnonyl; $R^2$ is selected from the group consisting of alkyl having 1 to 4 carbon atoms, hydrogen, alkenyl having 2 to 4 carbon atoms; $R^3$ is selected from the group consisting of alkylene having 2 to 12 carbon atoms, cyclohexylene, butylcyclobutenylene, phenylene and naphthylene; A is selected from the group consisting of hydrogen, alkali metals, alkaline earth metals, mercury, iron, lead, aluminum, ammonium, ureido, guanidino, pyridinium, 2-aminopyridinium, dimethylammonium, trimethylammonium, isohexylammonium, diisopropylammonium and benzylammonium; and $n$ is the valence of A.

2. A compound of the formula:

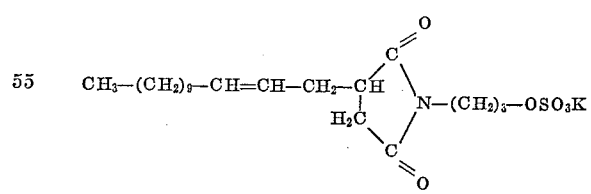

3. A compound of the formula:

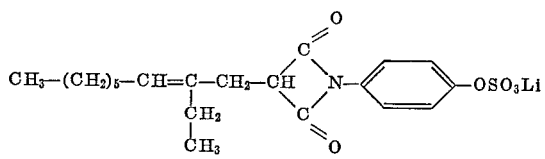

4. A compound of the formula:
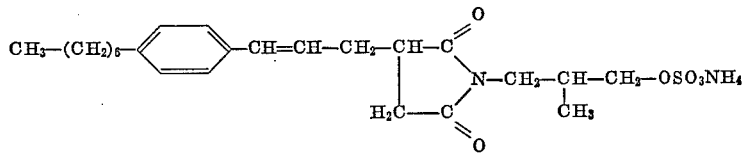
5. A compound of the formula:
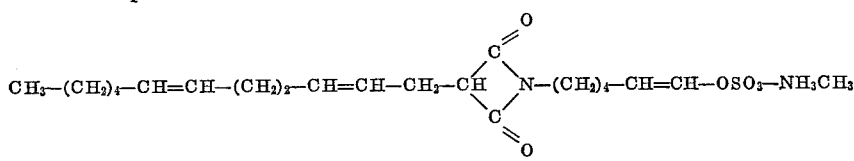
6. A compound of the formula:
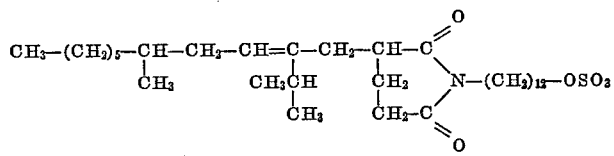
7. A compound of the formula:
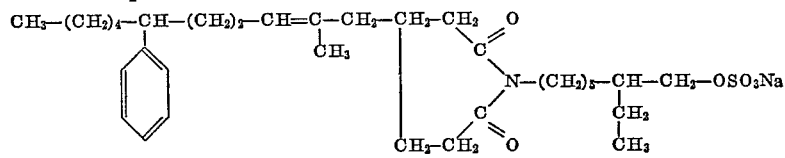
8. A compound of the formula:
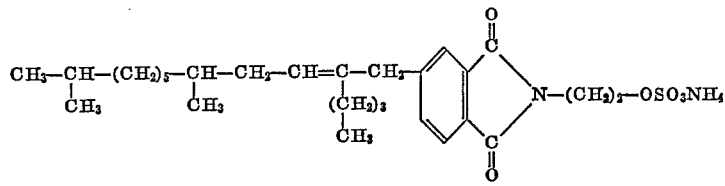
9. A compound of the formula:
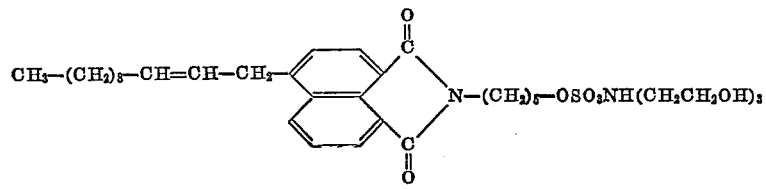
10. A compound of the formula:
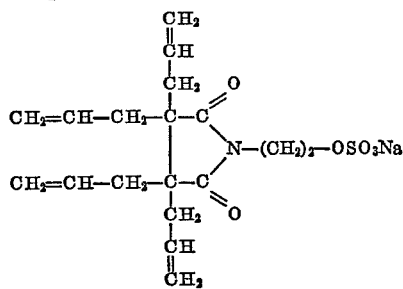
References Cited by the Examiner
UNITED STATES PATENTS
| | | | |
|---|---|---|---|
| 2,238,927 | 4/41 | Cahn et al. | 260—458 |
| 2,336,230 | 12/43 | Dickey et al. | 260—458 |
| 3,087,936 | 4/63 | Le Suer | 260—326.3 |
IRVING MARCUS, *Primary Examiner.*
NICHOLAS S. RIZZO, *Examiner.*

UNITED STATES PATENT OFFICE
CERTIFICATE OF CORRECTION

Patent No. 3,188,307                          June 8, 1965

Walter E. Kramer

It is hereby certified that error appears in the above numbered patent requiring correction and that the said Letters Patent should read as corrected below.

Columns 9 and 10, right-hand portion of the formula in claim 6, for "$-(CH_2)_{12}-OSO_3$" read -- $-(CH_2)_{12}-OSO_3Cs$ --.

Signed and sealed this 22nd day of March 1966.

(SEAL)
Attest:

ERNEST W. SWIDER                                   EDWARD J. BRENNER
Attesting Officer                                       Commissioner of Patents

UNITED STATES PATENT OFFICE
CERTIFICATE OF CORRECTION

Patent No. 3,188,307                                    June 8, 1965

Walter E. Kramer

It is hereby certified that error appears in the above numbered patent requiring correction and that the said Letters Patent should read as corrected below.

Columns 9 and 10, right-hand portion of the formula in claim 6, for "$-(CH_2)_{12}-OSO_3$" read -- $-(CH_2)_{12}-OSO_3Cs$ --.

Signed and sealed this 22nd day of March 1966.

(SEAL)

Attest:

NEST W. SWIDER
Attesting Officer

EDWARD J. BRENNER
Commissioner of Patents